Patented July 8, 1924.

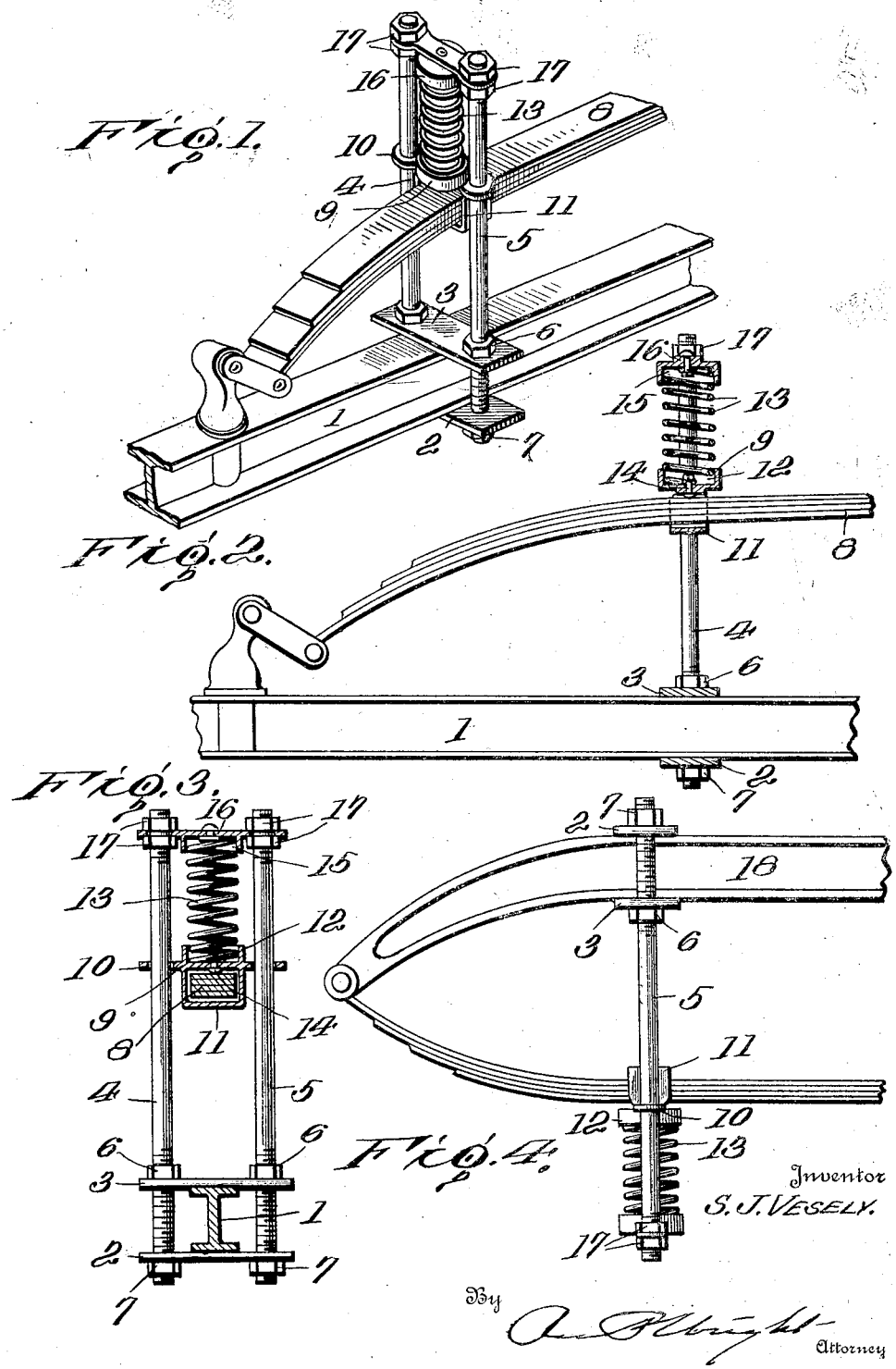

1,500,351

UNITED STATES PATENT OFFICE.

STANLEY J. VESELY, OF CEDAR RAPIDS, IOWA.

SHOCK ABSORBER.

Application filed April 21, 1921. Serial No. 463,105.

*To all whom it may concern:*

Be it known that I, STANLEY J. VESELY, a citizen of the United States, residing at Cedar Rapids, in the county of Linn and State of Iowa, have invented certain new and useful Improvements in Shock Absorbers, of which the following is a specification, reference being had therein to the accompanying drawing.

This invention relates to certain new and useful improvements in shock absorbers for motor vehicles, the object being to provide a construction of shock absorber which is capable of being used on various types of automobiles and one which is exceedingly simple and cheap in construction, the parts being so arranged and mounted that they are not likely to get out of order in use.

Another and further object of the invention is to provide a shock absorber having a spring which expands and contracts with the spring of the motor vehicle so as to reduce the shock and compensate for the rebound.

Other and further objects and advantages of the invention will be hereinafter set forth and the novel features thereof defined by the appended claims.

In the drawings,

Figure 1 is a detail perspective view of a portion of an automobile showing the application of my improved construction of shock absorber;

Figure 2 is a vertical section through the same;

Figure 3 is a transverse vertical section; and

Figure 4 is a detail elevation of a portion of an automobile showing the application of my improved construction of shock absorber to an elliptical spring where the same is fastened to the frame of the vehicle instead of to the axle.

In applying my improved construction of shock absorber to the Ford type of motor vehicle as illustrated in Figures 1 to 3 of the drawings, where 1 is the axle of the vehicle, I employ a pair of clips 2 and 3 arranged over the axle having apertures to each side thereof through which extends the lower ends of bolts 4 and 5 which are threaded as clearly shown to receive nuts 6 and 7 which securely clamp the clips over the axle so as to support the bolts 4 and 5 in vertical position, one of which being arranged to each side of the spring 8 of the vehicle as clearly shown.

Slidably mounted on the bolts 4 and 5 is a plate 9 having apertures 10 through which the bolts 4 and 5 extend, said plate being provided with a depending yoke 11 which loosely embraces the spring 8 as clearly shown in Figures 2 and 3. The top of the plate is provided with a cup 12 in which the lower end of a coiled spring 13 is secured by a rivet 14, the upper end of said spring extending into a cup 15 formed on a plate 16 and the free end thereof is secured as shown at 17. The plate 16 is provided with apertures through which the threaded upper ends of the bolts 4 and 5 extend, said bolts carrying nuts 17 for rigidly securing the plate 16 to the upper ends of the bolts.

It will be seen that by this construction that as the spring 8 of the motor vehicle yields or moves up and down, the plate 9 slides up and down on the bolts 4 and 5 so as to expand and contract the spring 13.

In Figure 4 I have shown a construction of a shock absorber substantially the same as disclosed in Figures 1 to 3 with the exception that the same is turned upside down and the bolts are rigidly secured to the frame 18 of the motor vehicle instead of to the axle 1 and it will be seen that by the particular construction of shock absorber illustrated the same is capable of being attached to various makes of automobiles now in use.

A shock absorber constructed in accordance with my invention when in use on the type of spring illustrated in Figures 1 to 3 provides means for stiffening the spring support of the vehicle as when the spring is forced downwardly, the spring of the shock absorber is expanded and when the same rebounds the spring is contracted so as to reduce the shock. The same action is accomplished by mounting the shock absorber as shown in Figure 4.

From the foregoing description it will be seen that I have produced a shock absorber which is composed of a very few parts so mounted and arranged on the motor vehicle that they are not likely to get out of order in operation, the parts being so mounted that they can be adjusted so as to increase or decrease the tension of the spring as by adjusting the position of the plate carried by the bolts, the position of the spring in respect to the spring of the vehicle can be adjusted.

What I claim is:—

1. A shock absorber for motor vehicles comprising a pair of plates having apertured ends adapted to embrace a fixed element of a vehicle, a pair of bolts extending through the apertures of said plates carrying nuts to each side of said plates for securing said plates over said fixed element and for supporting said bolts in vertical position one to each side of the spring of the vehicle, a plate having apertures slidably mounted on said bolts above the spring of the vehicle, said plate having a depending yoke extending under the spring of the vehicle, a cup formed on said plate, a coil spring seated in said cup having its ends secured therein, a second plate adjustably mounted on the upper ends of said bolts having a cup to receive the upper end of said coil spring and means for securing the upper end of said coil spring in said cup.

In testimony whereof I hereunto affix my signature.

STANLEY J. VESELY.